No. 699,201. Patented May 6, 1902.
DE WITT C. MARKHAM.
CATTLE TIE AND STANCHION.
(Application filed May. 16, 1901.)
(No Model.)
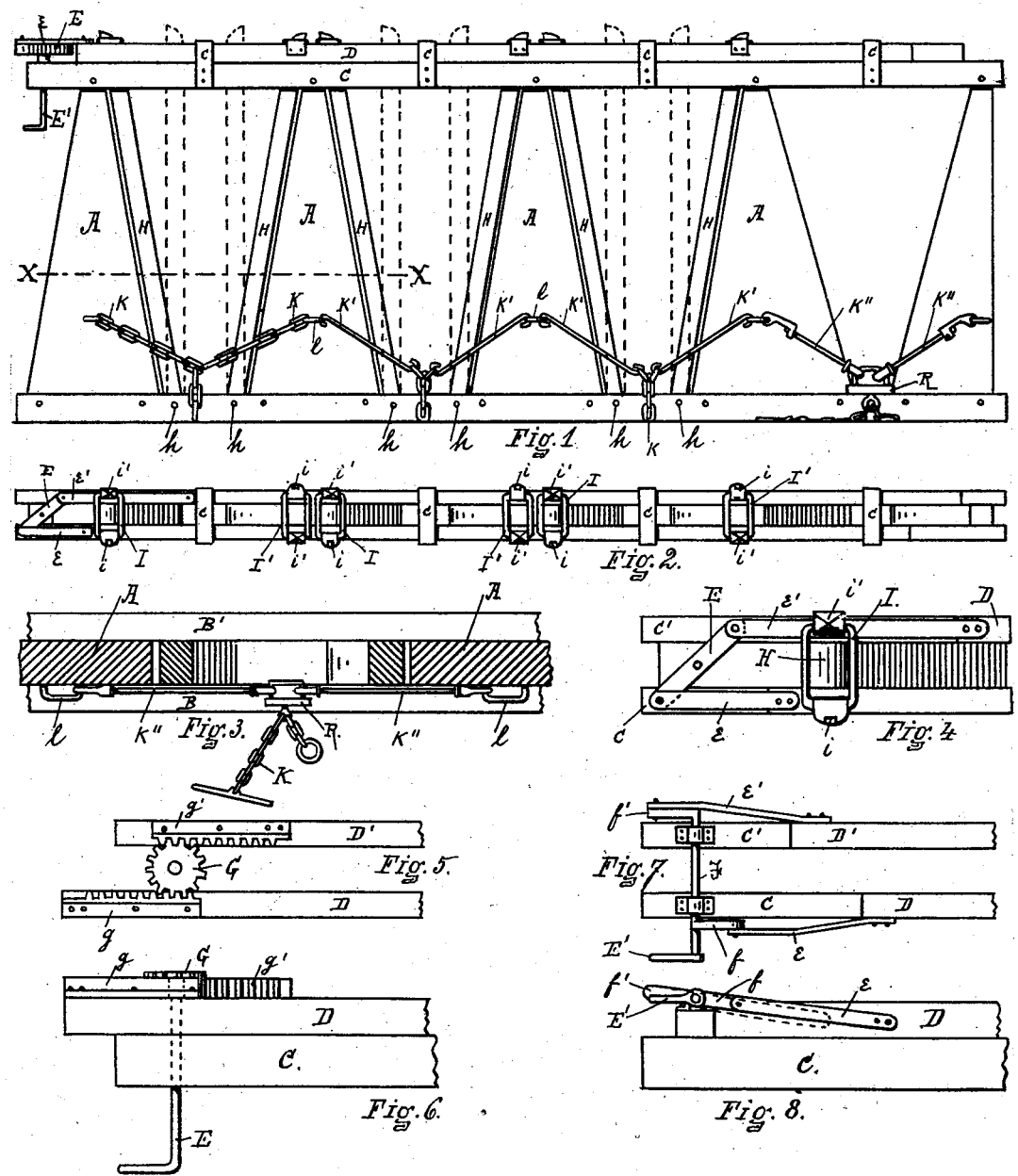
WITNESSES
Rich. A. George
Vernon W. Lee
INVENTOR
DE WITT C. MARKHAM
BY Kisley & Love
ATTORNEYS.

UNITED STATES PATENT OFFICE.

DE WITT C. MARKHAM, OF LEYDEN, NEW YORK.

CATTLE-TIE AND STANCHION.

SPECIFICATION forming part of Letters Patent No. 699,201, dated May 6, 1902.

Application filed March 16, 1901. Serial No. 51,451. (No model.)

*To all whom it may concern:*

Be it known that I, DE WITT C. MARKHAM, a citizen of the United States of America, residing at Leyden, in the county of Lewis and State of New York, have invented certain new and useful Improvements in Cattle-Ties and Stanchions, of which the following is a specification, reference being had therein to the accompanying drawings.

My invention relates to an improvement in cattle-ties and stanchions, the particular merit of which consists in its adjustability so as to secure or loosen a number of cattle by a single operation and also to release a single one without releasing the rest without materially destroying the arrangement and adjustment of the apparatus and in allowing the operator to tie or to stanchion the cattle without having to make changes before doing so. The cattle may be tied by the use of the swivels and the ring connecting them, the swivels being so fashioned that they slide along the rods when the cattle are standing or lying down. By the use of the ring and bar attached to the chains the cattle may be easily loosened or tied by the operator.

The advantages of having a cattle-tie and stanchion in combination are that when the cattle are driven in and take their places the operator can secure them with one operation, preventing them from moving about while he is going through the operation of securing them with a tie-fastening. Then by one operation he can open the stanchions, giving the animal the freedom that the tie permits, and in case the animal is wet from storm it can be allowed to stand and dry off after the stanchions are closed before the operator has to pass between them in the act of tying them, avoiding the inconvenience of getting wet, which would be the case if the combination were not used. The advantage of the tie over the stanchions is that when the cattle have to be kept in the greater part of the time they are allowed more freedom of the head and can lie down in a natural position, making them more comfortable and happier. During the season when the cattle are kept in the barn but a short time the stanchions are more convenient, allowing the operator to secure and release the cattle much easier and quicker. The stanchion-bars and the neck-fastening have a particular value, however, in their use together, the employment of both in the same structure presenting a cattle-fastener or stanchion which has a practical utility and novelty over any device employing either alone. The difficulty has been that when a herd is driven into the stable and each is to be tied separately great confusion arises because the cattle will not stand quietly in place until tied, but move about and crowd each other, so that considerable effort is required to get them in proper place again.

The advantage of the structure which I show is that when driven into their place the cattle may be secured in place by simultaneous operation of the stanchion-bars or even by one bar in each series, and after they have been secured by the neck-fastening the stanchion-bars may be turned back and greater freedom and comfort be given to the cattle. The chains, bars, and rings of the neck-fastening are secured on the stall side of the stanchion-bars and not on the manger side, so that the cattle thereby are prevented from crowding into the manger or on the platform, but have liberty of movement on the stall side of the stanchions.

I do declare that the following is a full, clear, and exact description of my invention, sufficient to enable one skilled in the art to make and use the same, reference being had to the accompanying drawings, in which like letters refer to like parts throughout.

Figure 1 represents a front view of my apparatus. Fig. 2 represents a top view. Fig. 3 represents a horizontal sectional view on the line X X, but showing the tie-rods. Fig. 4 represents a plan view of a portion of the operative part of my apparatus. Fig. 5 represents a plan view of a modified construction of the operative portion of my device. Fig. 6 represents a side view of the same. Fig. 7 represents a plan view of a further modified method of operation. Fig. 8 represents a side view of the same.

Referring to the figures more in detail, A represents division boards or standards, which are represented as wider at the base than at the top, with converging sides, and which separate the stanchion-bars into pairs. These standards are securely fastened in their upright position by being attached to bottom rails B and B'. At the top are top rails C and C', which are securely connected with the standards A. I show the rails B and B' and C and C'; but it would be sufficient if a single rail were used at the bottom and a single rail at the top, so long as the purpose of supporting the standards and stanchion-bars in a vertical position is accomplished and a support is provided for the sliding rails D and D', which are adapted to move on the top rails lengthwise. I provide clasps c, which are fastened to the top rails and pass over the sliding rails, so as to act as guides in the operation of the sliding rails. The sliding rails are intended to move reciprocally upon the top rails, and to accomplish this I provide a suitable mechanism, which I show in the drawings in a variety of forms.

E is a cross-bar, to which is attached a lever or handle E'.

e and e' represent connecting-rods, one of which is pivotally attached at one of its ends to one end of the cross-bar and the other is likewise attached to the other end of the cross-bar. These connecting-rods are pivotally attached at the other end to the end of the sliding rails, each being attached to the rail on its own side. By this construction I am enabled by operating the lever to turn the cross-bar, and thus push one sliding rail in one direction and draw the other one in the opposite direction. A modified structure for producing this result is shown in Figs. 5 and 6, where G represents a pinion attached to the lever E, and g and g' represent two notched rails or gear-racks, which are fixed to the sliding rails and in which the teeth of the pinion engage, and thus produce a reciprocating movement of the sliding rails. Figs. 7 and 8 show a further modification, which consists of the shaft F, with the crank-arms f and f', one on each side of the frame. To the ends of these crank-arms are pivotally attached the connecting-rods e and e', so that by operating the lever E the same reciprocal movement of the sliding rails is produced as in the other constructions shown.

H represents stanchion-bars, which are pivotally attached to the bottom rail or rails at h in pairs, one on each side of the opening between the standards A. The free end of these stanchions move parallel with and between the sliding rails.

I and I' represent loops which are hinged in a suitable manner at i on the sliding rails in pairs, one of each pair being attached to one sliding rail and the other to the other sliding rail, so as to accomplish the purpose below described. These loops are weighted opposite to the point of attachment, as at i', so as to make them more effective. These loops rest over the ends of the stanchion-bars, which project a suitable distance above the lines of the sliding rails, the whole being so arranged that the reciprocating movement of the sliding rails moves the upper ends of the stanchion-bars apart or draws them together by means of the loops I and I', according to the will of the operator and the movement of the lever E.

In operation the lever is moved so as to move the free ends of the stanchion-bars, and thereby open the entire series in readiness to secure the cattle. When the herd has been driven into the stable and into the proper stalls and it is desired to secure them, the lever is turned in the opposite direction and the reciprocating movement of the sliding rails through the action of the loops draws the tops of the stanchion-bars together, and thereby secures all of the cattle. If it is desired at any time to release a single head, the loops I and I' may be lifted and the stanchion-bars then moved aside and the loops allowed to fall in their natural position. Thereafter when all of the herd are released those loops move along the sliding rails and pass over the ends of the stanchion-bars, which are cut off at an angle at their upper ends, so that each loop may pass over the top of its stanchion-bar and fall into place over the stanchion-bar head.

The cattle may be secured in place by the stanchion-bars alone, but I also show chains and chain-rods which I provide and which may be used in addition to the stanchion-bars or without them, whereby the animal is free to withdraw its head and neck from between the standards and is prevented from doing damage to other animals next to it.

K represents the chains, one end of which is securely fastened to the standard A, at about the middle vertical line thereof, by a staple or other suitable means. The chains are connected at their other ends at about the middle vertical point between the stanchion-bars, from which point depends the chain and cross-bar for securing the cattle.

If preferred, instead of using chain K the chain-rod K', as shown in Fig. 1, may be used for the distance between the center of the standard and the center of the stanchion-opening. I also provide a form of rod K'', which is attached to the standard A by a swivel, which is of such form that it may slide along the rod. There is a like swivel at the other end of the rod. The swivels at the free end of each of a pair of the rods K'' are connected by the ring or other device R, from which depend suitable chains provided with a ring and bar or other suitable device for securing the cattle. The use of the chains K or the chain-rods K' or K'' prevents the cattle from stepping forward between the stanchion-bars, and thus prevents the littering of the stall in the place designed for the cattle to lie.

What I claim as new, and desire to secure by Letters Patent, is—

1. In a stanchion, a pair of stanchion-bars pivoted at their lower ends, mounted to swing into and out of their vertical positions, a pair of horizontal sliding rails mounted to be operated in opposite directions, each sliding rail being provided with a gear-rack secured thereto and a pivoted gear-wheel mounted between the gear-sections and meshing into the same, and pivoted swinging loops or latches alternately mounted on the horizontal movable rails to engage the ends of the pivoted stanchion-bars, combined for the purposes stated.

2. In a stanchion, the combination of a series of pairs of stanchion-bars, pivoted at their lower ends, their upper free ends arranged to swing to and from vertical positions, a pair of horizontal sliding rails located on opposite sides of the stanchion-bars and mounted to be operated in opposite directions, a series of pivoted loops mounted alternately on the horizontal sliding rails to engage the free ends of the pivoted stanchion-bars for moving them into and out of vertical positions and means substantially as set forth for moving the horizontal rails in opposite directions, whereby a series of animals can be secured in the stalls and liberated in one operation, substantially as set forth.

3. In a stanchion, a succession of pairs of standards, wider at the base than at the top, link connections secured to the standards, one on each side of the space between the standards and united at their inner ends, and a chain or other fastening device provided with means for surrounding the neck of the animal, in combination with pivotally-movable stanchion-bars, substantially as set forth for the purposes stated.

4. In a stanchion, pairs of standards, substantially as shown, secured in the frame of the stall, for permitting the neck and head of the animal to be inserted between the standards, a pair of connecting-rods with one end of each swiveled to the standard on each side of the opening and connected at the center, with means for securing the same to the neck of the animal, in combination with movable stanchion-bars, substantially as set forth for the purposes stated.

5. In a stanchion, a frame comprising upper and lower rails with upright standards between them, stanchion-bars pivotally attached to the lower rail, reciprocally-moving sliding rails, means for detachably connecting the sliding rails and the stanchion-bars, means for oppositely reciprocating the sliding rails, in combination, substantially as set forth.

6. In a stanchion, upright standards, rails connecting the standards at the top and bottom, stanchion-bars pivotally seated on one of the rails, means comprising reciprocally-moving rails for turning on its bearing each stanchion-bar, in combination, substantially as set forth.

7. In a stanchion and cattle-tie, a frame comprising top and bottom rails, standards suitably attached to the rails, chain-rods attached to the standards provided with links and bars for securing the cattle, in combination, substantially as set forth.

8. In a stanchion or cattle-tie, upright standards, rails connecting the same at the top and bottom, chain-rods secured to the upright standards by swivels, swivels attached to each chain-rod, a link connecting the free ends of the chain-rods in the spaces between the standards, suitable means for securing the cattle depending from the link, in combination, substantially as set forth.

9. In a stanchion or cattle-tie, successive pairs of standards separated to allow the animal to withdraw the head freely from between the standards, rods and chains suitably secured at the one end to the standards one on each side of the opening, said rods and chains being connected at their adjoining ends with means for securing the chains and rods to the animal, in combination, substantially as set forth.

10. In a stanchion and cattle-tie, standards rigidly secured to the top and bottom, stanchion-bars pivotally attached to the bottom rail with openings between wide enough to allow the animal's head and neck to pass through between the stanchion-bars at will, rods and chains swiveled at the one end to the standards between the top and bottom rails and on the stall side of the standards, one on each side of the opening, said rods and chains being connected together at the center, in combination with means for securing the same to the neck of the animal whereby the animal is free to withdraw its head, but is prevented from working up and through the manger side by rods and chains coming in contact with the upright standards or stanchion-bars, substantially as set forth for the purposes stated.

11. In a stanchion and cattle-tie, standards rigidly secured to the top and bottom, rods and chains swiveled at one end to the standards between the top and bottom rails on the stall side of the standards, one on each side of the opening, said rods and chains being connected at the center, in combination with means for securing the same to the neck of the animal, the chains and rods and neck connections being adjusted to permit the animal to withdraw its head and to prevent it from crowding into the manger by the rods and chains coming in contact with the upright standards or bars, substantially as set forth for the purposes stated.

12. In a stanchion, a frame comprising top and bottom rails and standards suitably fixed to the top and bottom rails, chain-rods attached to the standards and having yielding connections and provided with means for securing the cattle by yielding fastenings, in combination, substantially as set forth.

13. In a cattle-tie or stanchion, a rigid frame having standards secured therein, stanchion-bars pivotally seated in the base of the frame, chain-and-rod connections secured to the standards and connected at their other end with neck-fastenings for the cattle whereby are provided yielding fastenings, sliding rails adapted to be moved reciprocally, detachable connections between the sliding rails and the stanchion-bars, in combination, substantially as set forth.

14. In a stanchion, upright standards, horizontal rails connecting the same at the top and bottom, chain-rods secured to the upright standards by swivels, swivels attached to each end of the chain-rods, a ring connecting the free ends of the chain-rods in the spaces between the standards, chains or other suitable means for securing the cattle depending from the ring, in combination, substantially as set forth.

In testimony whereof I affix my signature in presence of two witnesses.

DE WITT C. MARKHAM.

Witnesses:
F. D. MARKHAM,
DAVID E. JONES.